3,784,551
2-OXO-1,4-DIOXA-8-AZASPIRO (4.5) DECANES AND RELATED COMPOUNDS
Michio Nakanishi, Oita, Katsuo Arimura, Yoshitomi, and Hideki Ao, Oita, Japan, assignors to Yoshitomi Pharmaceutical Industries, Ltd., Osaka, Japan
No Drawing. Filed July 8, 1971, Ser. No. 160,937
Int. Cl. C07d 99/04, 99/06
U.S. Cl. 260—293.66                          11 Claims

ABSTRACT OF THE DISCLOSURE

Spiro compounds of the formula

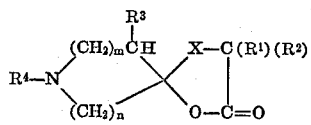

wherein each of $R^1$ and $R^2$ is H, $CH_3$ $C_2H_5$, phenyl, p-chlorophenyl or benzyl; X is O or S; $R^3$ is H and $R^4$ is H, alkyl of 1 to 4 carbon atoms, methoxycarbonyl, ethoxycarbonyl, acetyl, benzoyl, benzyl, phenethyl, pyridylmethyl, pyridylethyl, furfuryl, thenyl, cinnamyl, cinnamoyl, allyl or propargyl, and $m$ plus $n$ is 2 or 3 ($m$ being 0 or 1 and $n$ being 2 or 3); or $R^3$ and $R^4$ combinedly represent —$CH_2$—$CH_2$—, $m$ is 2 and $n$ is 1, and pharmaceutically acceptable acid addition and quaternary ammonium salts thereof are useful as acetylchlorine antagonistic agents and gastric juice secretion inhibiting agents.

PRIOR ART (1) In our copending application, filed Dec. 31, 1970, Ser. No. 103,322, now U.S. 3,723,442, there are disclosed spiro piperidine compounds of the formula

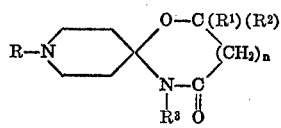

and pharmaceutically acceptable acid addition salts thereof, wherein R is H, acetyl, allyl, 2-propynyl, 2-cyanoethyl, $C_{1-4}$ alkyl, $C_{1-4}$ alkoxycarbonyl, $C_{1-4}$ alkoxycarbonylethyl, benzoyl, benzyl or phenethyl, each of $R^1$ and $R^2$ is H, methyl, ethyl or phenyl, $R^3$ is H, $C_{1-4}$ alkyl, benzyl, phenyl or substituted phenyl, the substituent being selected from the group consisting of Cl, $CH_3$, $CH_3O$ or $CF_3$, and $n$ is 0 or 1, which have strong reserpine antagonistic activity and blood sugar lowering action.

(2) British Pat. No. 1,203,430 discloses heterocyclic spiro compounds of the formula

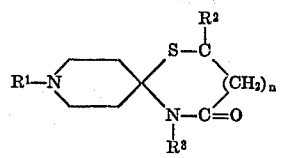

and pharmaceutically acceptable acid addition salts thereof, wherein $R^1$ is hydrogen, an alkyl group of 1 to 4 carbon atoms, lower alkenyl, lower alkynyl, lower alkoxycarbonyl, benzyloxycarbonyl, lower alkoxy-lower alkyl, phenoxy-lower alkyl, benzoyl, trimethoxybenzoyl or aralkyl optionally substituted by halogen, nitro or lower alkyl, $R^2$ is hydrogen or lower alkyl, $R^3$ is hydrogen, lower alkyl, cycloalkyl, aralkyl or aryl optionally substituted by halogen, lower alkyl, lower akoxy or trifluoromethyl, and $n$ is 0 or 1 where the term "lower" means that the alkenyl, alkynyl, alkoxycarbonyl, alkyl or alkoxy has not more that four carbon atoms, which are useful as psychotropic drugs.

This invention relates to novel and therapeutically valuable spiro compounds of the formula

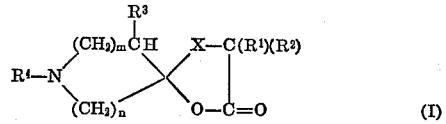

as well as pharmaceutically acceptable acid addition and quaternary ammonium salts thereof. In the above formula, each of $R^1$ and $R^2$ is H, $CH_3$, $C_2H_5$, phenyl p-chlorophenyl or benzyl; X is O or S; $R^3$ is H and $R^4$ is H, alkyl of 1 to 4 carbon atoms (e.g. methyl, ethyl, propyl, butyl), methoxycarbonyl, ethoxycarbonyl, acetyl, benzoyl, benzyl, phenethyl, pyridylmethyl (e.g. 2-pyridylmethyl, 3-pyridilmethyl), pyridylethyl (e.g. 2-pyridylethyl, 4-pridylethyl), furfuryl, thenyl (2-thenyl, 3-thenyl), cinnamyl, cinnamoyl, allyl or propargyl, and $m$ is plus $n$ is 2 or 3 ($m$ being 0 or 1 and $n$ being 2 or 3); or, $R^3$ and $R^4$ combinedly represent —$CH_2$—$CH_2$—, $m$ is 2 and $n$ is 1. In this latter case the compounds of Formula I are quinuclidine spiro compounds which can be represented by the formula

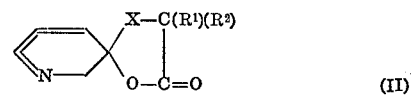

The compounds of Formula I can be produced by the following methods:

(i) By the reaction of a compound of the formula

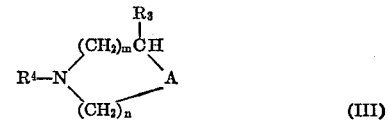

wherein A is —CO— or —C(OH)$_2$—, with a compound of the formula

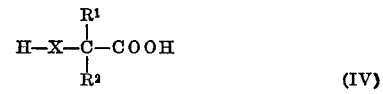

This reaction is usually carried out (a) in a solvent such as benzene, toluene, xylene, chloroform, dichloroethane, carbon tetrachloride, methanol, ethanol, 2-propanol or dioxane, in the presence of an acid catalyst such as p-toluenesulfonic, benzenesulfonic, sulfuric, phosphoric or hydrochloric acid, under reflux for 5 to 20 hours, while water produced is removed from the reaction system, or (b) in a solvent such as methanol, ethanol, 2-propanol, dioxane, chloroform, tetrahydrofuran, benzene, toluene or xylene, in the presence of a dehydrating agent such as calcium oxide, anhydrous magnesium sulfate, anhydrous zinc chloride, molecular sieve or N,N'-dicyclohexylcarbodiimide, at room temperature or an elevated temperature, for example at the boiling point of a solvent employed, for 3 to 20 hours.

(ii) By the reaction of the compound of the formula

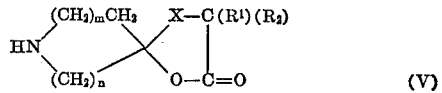

with a compound of the formula

wherein Y is halogen or reactive radical such as methylsulfonyloxy, phenylsulfonyloxy or p-tolylsulfonyloxy.

This reaction is carried out in a solvent such as methanol, ethanol, 2-propanol, benzene, toluene, xylene, chloroform, dimethylformamide, dioxane, tetrahydrofuran, acetone, methyl ethyl ketone or methyl acetate, in the presence of a deacidifying agent such as alkali metal carbonate, alkali metal hydrogen carbonate, alkali metal hydroxide, alkali metal alkoxide, trimethylamine, triethylamine, N,N-diethylaniline or pyridine, under reflux for 3 to 20 hours.

(iii) The compounds of Formula I wherein $R^4$ is $C_{1-4}$ alkyl are produced by alkylating a compound of Formula V with formaldehyde (for methylation) or dialkyl sulfate such as dimethyl sulfate, diethyl sulfate or dibutyl sulfate.

The methylation with formaldehyde is carried out by heating the mixture of a compound of Formula V and formaldehyde and, if desired in the presence of formic acid, under reflux for 1 to 5 hours.

The alkylation with dialkyl sulfate is carried out in a solvent such as ether (e.g. ethyl ether, propyl ether, butyl ether), chloroform or benzene, in the presence of a de-acidifying agent such as alkali metal carbonate, alkali metal hydrogen carbonate, alkali metal hydroxide or alkali metal alkoxide for several to 10 hours.

(iv) The compounds of Formula I wherein $R^4$ is hydrogen atom are produced by eliminating $R''$ group in a compound of the formula

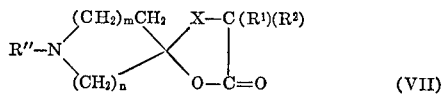

(VII)

wherein $R''$ is benzyl or $C_{1-2}$ alkoxycarbonyl.

The benzyl elimination is carried out by subjecting a compound (VII) ($R''$ being benzyl) to catalytic reduction using a catalyst such as palladium-carbon, palladium oxide or Raney-nickel, in an inert solvent such as water, methanol, ethanol, 2-propanol, glacial acetic acid or dioxane under normal or increased pressure at room temperature up to about 100° C. for 1 to 20 hours.

The alkoxycarbonyl elimination is carried out by treating a compound (VII) ($R''$ being $C_{1-2}$ alkoxycarbonyl) with an acid such as hydrogen chloride, hydrogen bromide, hydrogen fluoride or perchloric acid in a solvent, preferably with 10-25% hydrogen bromide in acetic acid, under anhydrous conditions to avoid the decomposition of the spiro ring, or with an alkali such as sodium hydroxide, potassium hydroxide, barium hydroxide, calcium hydroxide or magnesium hydroxide in a solvent such as water, methanol, ethanol, 2-propanol, ethylene glycol or trimethylene glycol at about boiling point of the solvent employed for 2 to 25 hours.

The compounds of Formula I can be converted into acid addition salts with various inorganic acids (e.g. hydrochloric, hydrobromic, nitric, sulfuric acid) or various organic acids (e.g. oxalic, maleic, fumaric, tartaric acid), and also into quaternary ammonium salts with methyl chloride, methyl bromide, methyl iodide, butyl iodide methyl hydrogensulfate or dimethyl sulfate.

The compounds of Formula I as well as their pharmaceutically acceptable acid addition and quaternary ammonium salts have acetylcholine antagonistic activity and gastric juice secretion inhibiting activity, and are useful as drugs for the treatment of various gastro-enteric spasms (algospasms), gastric hyperacidities and gastro-enteric ulcers.

For example, the compounds of Formula I listed below (A, B, . . . N) have the following pharmacological properties.

(A) 8 - methyl-3,3-diphenyl-2-oxo-1,4-dioxa - 8 - azaspiro[4.5]decane methoiodide
(B) 8 - butyl-3,3-diphenyl-2-oxo-1,4-dioxa - 8 - azaspiro[4.5]decane methoiodide
(C) 8 - methyl-3-methyl-3-phenyl-2-oxo-1,4-dioxa-8-azaspiro[4.5]decane methoiodide
(D) 8 - methyl-3-benzyl-3-phenyl-2-oxo-1,4-dioxa-8-azaspiro[4.5]decance methoiodide
(E) 8 - (2 - thenyl)-3,3-diphenyl-2-oxo-1,4-dioxa-8-azaspiro[4.5]decane methoiodide
(F) 8 - methyl - 3,3-diphenyl 2 oxo-1-oxa-4-thia-8-azaspiro[4.5]decane hydrochloride
(G) 8 - methyl - 3,3-diphenyl-2-oxo-1-oxa-4-thia-8-azaspiro[4.5]decane methoiodide
(H) 8-methyl-3,3-diphenyl-2-oxo-1,4 - dioxa - 8-azaspiro [4.5]decane ethobromide
(J) 8 - methyl-3,3-diphenyl-2 - oxo-1,4-dioxa-8 - azaspiro [4.5]decane methyl hydrogensulfate
(K) 8 - methyl-3,3-diphenyl-2-oxo-1,4-dioxa-8 - azaspiro [4.5]decane dimethyl sulfate
(L) 8 - cinnamyl 3,3-diphenyl-2-oxo-1,4-dioxa - 8-azaspiro[4.5]decane methoiodide
(M) 1 - azabicyclo[2.2.2]octane-3 - spiro-2' - (5',5'-diphenyl-1',3'-dioxolan-4'-one) methoiodide
(N) 1 - azabicyclo[2.2.2]octane-3 - spiro - 2' - (5',5'-diphenyl-1',3'-dioxolan-4'-one) maleate The tests were carried out by the following procedures:

(A) Acetylcholine antagonistic activity

Acetylcholine antagonistic activity was tested according to the method described by J. M. Van Rossum et al. in "Archives Internatationales de Pharmacodynamie et de Therapie," vol. 143, pages 240–246 and 299–330 (1963). $pA_2$ is the negative of the logarithm, to the base 10, of the molar concentration of the test compound which reduced the effect of twice dose of acetylcholine on contracting action of the guinea pig intestine to that of a single dose.

The results are shown in Table 1.

TABLE 1

| Test compound: | Acetylcholine antagonistic activity, $pA_2$ |
|---|---|
| A | 9.3 |
| B | 7.0 |
| C | 6.6 |
| D | 7.8 |
| E | 7.3 |
| F | 7.2 |
| G | 8.2 |
| H | 8.8 |
| J | 9.4 |
| K | 9.3 |
| M | 8.6 |
| N | 8.5 |
| Atropine (for comparison) | 9.2 |
| Scopolamine-N-butyl bromide (for comparison) | 7.1 |

(B) Effect on gastric juice secretion in Shay rats

Effect on gastric juice secretion was tested according to the method described by Paul Bass and Margaret A. Patterson in "The Journal of Pharmacology and Experimental Therapeutics," vol. 156, pages 142–149 (1967). Wistar strain female rats (130–200 g.) were deprived of meal for 48 hours and the pylorus was ligated. $ED_{50}$ shows the subcutaneous dose of the test compound required for 50% depression of gastric juice secretion against the control Shay rats.

The results are shown in Table 2.

TABLE 2

| Test compound: | Depressive effect on gastric juice secretion in Shay rats, $ED_{50}$ (mg./kg.) |
|---|---|
| A | 0.06 |
| B | 2.8 |
| C | 6.4 |
| D | 1.0 |
| E | 3.3 |
| G | 1.5 |
| H | 0.05 |
| J | 0.04 |
| L | 2.0 |
| M | 0.2 |
| N | 1.2 |
| Atropine | 0.2 |
| Scopolamine-N-butyl bromide | 1.4 |

The compounds (I) and pharmaceutically acceptable acid addition and quaternary ammonium salts thereof can be admixtured safely per se or in the form of a pharmaceutical composition in admixture with a suitable carrier or adjuvant without causing harm to the patient.

The pharmaceutical composition can take the form of tablets, injectable solution, granules, powder, etc. The following are examples of the compositions of the invention which may be administered for pharmaceutical purposes.

(1) Injectable solution containing 1 mg. of compound J per ml. is prepared from the following composition:

|  | Mg. |
|---|---|
| Compound J | 1 |
| Sodium chloride | 9 |

Water for injection; a sufficient amount to make 1 ml.

(2) 0.5 mg. tablets are prepared from the following composition:

|  | Mg. |
|---|---|
| Compound J | 0.5 |
| Lactose and starch | 70.5 |
| Microcrystalline cellulose | 5.0 |
| Methyl cellulose | 1.0 |
| Magnesium stearate | 1.0 |
| Talc | 2.0 |
| Total (per tablet) | 80.0 |

The pharmaceutical compositions may be administered orally or parenterally, usual daily doses lying in the range of 1.5 to 6.0 mg. per human adult.

In the following examples, "g.," "ml.," "M.P." and "B.P." represent "gram(s)," "milliliter(s)," "melting point" and "boiling point," respectively.

EXAMPLE 1

A mixture of 17.1 g. of 1-ethoxycarbonyl-4-oxopiperidine, 11 g. of thioglycolic acid and 0.3 g. of p-toluenesulfonic acid in 200 ml. of benzene is heated under reflux with stirring in a flask provided with a water trap for 8 hours. After cooling, the reaction mixture is washed with water, with sodium bicarbonate solution and again with water. The mixture is dried over anhydrous sodium sulfate, and the residue is distilled off under reduced pressure. The residue is distilled under vacuum to give 17 g. of 8-ethoxycarbonyl-2-oxo - 1 - oxa - 4 - thia-8-azaspiro-[4.5]decane as pale yellow liquid boiling at 177–179° C./0.2 mm. Hg and showing $n_D^{23.5}=1.520$. The liquid product solidifies on standing. The solid melts at 42–45° C.

EXAMPLE 2

A mixture of 18.9 g. of 1-benzyl-4-oxopiperidine, 15.2 g. of DL-mandelic acid and 8 ml. of concentrated sulfuric acid in 400 ml. of chloroform is heated under reflux with stirring in a flask with a water trap attached for 9 hours. After cooling, a viscous oil layer separates. The viscous oil is collected by decantation, and alkalified with an aqueous potassium carbonate solution. The crystals that formed are collected by filtration, washed with water and recrystallized from 2-propanol to give 20 g. of 8-benzyl-2-oxo-3-phenyl-1,4-dioxa - 8 - azaspiro[4.5]decane as white crystals melting at 127° C. Its hydrochloride melts at 226° C.

EXAMPLE 3

A mixture of 4.7 g. of 4,4-dihydroxypiperidine hydrochloride, 4.7 g. of 2-mercaptopropionic acid and 2 to 3 drops of concentrated sulfuric acid in 80 ml. of chloroform is heated under reflux in a flask with a water trap attached for 8 hours. After cooling, the crystals formed are collected by filtration and recrystallized from methanol to give 2.3 g. of 3-methyl - 2 - oxo-1-oxa-4-thia-8-azaspiro[4.5]decane hydrochloride as white crystals melting at 228° C.

EXAMPLES 4 TO 51

Other examples of compounds (I) ($R^3$ being H) and acid addition salts thereof which can be produced from a compound (III) ($R^3$ being H) and a compound (IV) in a manner similar to that described in Examples 1 to 3 are as follows:

| Example | $R^4$ | m | n | X | $R^1$ | $R^2$ | Physical constant |
|---|---|---|---|---|---|---|---|
| 4 | H | 1 | 2 | O | H | $CH_3$— | HCl M.P.: 229° C. |
| 5 | H | 1 | 2 | S | H | H | HBr M.P.: 212–213° C. |
| 6 | H | 1 | 2 | S | H |  | HBr M.P.: 245° C. (decomposition). |
| 7 | H | 1 | 2 | O |  | Same as above | M.P.: 113° C., HBr M.P.: 241° C. |
| 8 | H | 1 | 2 | O | $C_2H_5$— | do | Oxalate M.P.: 205° C. |
| 9 | H | 1 | 2 | S | $CH_3$— | $CH_3$— | HBr M.P.: 251° C. |
| 10 | H | 1 | 2 | O | $CH_3$— | $CH_3$— | HBr M.P.: 184–185° C. |
| 11 | H | 1 | 2 | O | $CH_3$— | phenyl | Acid maleate M.P.: 175° C. |
| 12 | H | 1 | 2 | O | H | H | HCl M.P.: 212° C. (decomposition). |
| 13 | H | 1 | 2 | O | H | phenyl | HCl M.P.: 194–195° C. (decomposition). |
| 14 | $C_2H_5OCO$— | 1 | 2 | S | H | $CH_3$— | B.P.: 161–165° C./0.2 mm. Hg, $n_D^{23.5}=1.5108$. |
| 15 | $C_2H_5OCO$— | 1 | 2 | O | H | H | M.P.: 61–63° C., B.P.: 145–148° C./0.2 mm. Hg, $n_D^{24}=1.4819$. |
| 16 | $C_2H_5OCO$— | 1 | 2 | S | H | phenyl | M.P.: 127° C. |
| 17 | $C_2H_5OCO$— | 1 | 2 | O | H | Same as above | M.P.: 80° C. |
| 18 | $C_2H_5OCO$— | 1 | 2 | S | $CH_3$— | $CH_3$— | B.P.: 145–149/0.15 mm. Hg, $n_D^{24.5}=1.5028$. |
| 19 | $C_2H_5OCO$— | 1 | 2 | O | $C_2H_5$— | phenyl | $n_D^{24.5}=1.5137$. |
| 20 | $C_2H_5OCO$— | 1 | 2 | O | phenyl | Same as above | M.P.: 96° C. |
| 21 | $C_2H_5OCO$— | 1 | 2 | O | $CH_3$— | $CH_3$— | M.P.: 86–87° C. |
| 22 | $C_2H_5OCO$— | 0 | 2 | S | H | H | B.P.: 148–150° C./0.2 mm. Hg. $n_D^{22.0}=1.5190$. |

TABLE—Continued

| Example | R⁴ | m | n | X | R¹ | R² | Physical constant |
|---|---|---|---|---|---|---|---|
| 23 | $C_2H_5OCO-$ | 1 | 2 | O | $CH_3-$ | 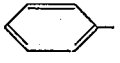 | B.P.: 180–183° C. /0.25 mm. Hg, $n_D^{23.5}=1.5169$. |
| 24 | 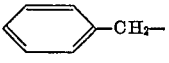$-CH_2-$ | 1 | 2 | S | H | H | Maleate M.P.: 182° C. |
| 25 | Same as above | 1 | 2 | O | H | $CH_3-$ | HCl M.P.: 250° C. |
| 26 | do | 1 | 2 | O | 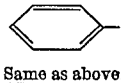 | 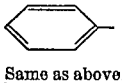 | HCl M.P.: 236–237° C. |
| 27 | do | 0 | 3 | O | Same as above | Same as above | M.P.: 107° C., oxalate M.P.: 178–179° C. |
| 28 | do | 1 | 2 | O | H | H | HCl M.P.: 168° C., maleate M.P.: 154–155° C., $n_D^{22.4}=1.5370$. |
| 29 | 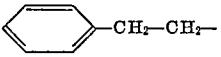$-CH_2-CH_2-$ | 1 | 2 | O | 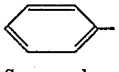 |  | M.P.: 135° C., maleate M.P.: 180° C. |
| 30 | 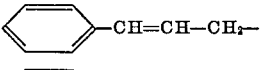$-CH=CH-CH_2-$ | 1 | 2 | O | Same as above | Same as above | M.P.: 81° C. |
| 31 | 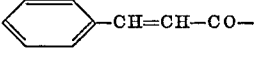$-CH=CH-CO-$ | 1 | 2 | O | do | do | M.P.: 134–135° C. |
| 32 | $CH_3-$ | 1 | 2 | O | do | do | M.P.: 135° C., HCl M.P.: 254° C., oxalate M.P.: 245° C. |
| 33 | $CH_3-$ | 1 | 2 | O | H | 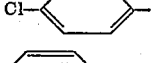 | M.P.: 82–84° C., HCl M.P.: 222–223° C. |
| 34 | $CH_3-$ | 1 | 2 | O | H | 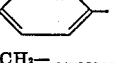 | M.P.: 54° C., HCl M.P.: 207–208° C., maleate M.P.: 148–149° C. |
| 35 | $CH_3-$ | 1 | 2 | O | $CH_3-$ | $CH_3-$ | HCl M.P.: 228° C., $n_D^{24}=1.5481$. |
| 36 | $CH_3-$ | 1 | 2 | O | H | $CH_3-$ | HCl M.P.: 261° C. (decomposition), $n_D^{23}=1.4668$. |
| 37 | $CH_3-$ | 1 | 2 | O | $CH_3-$ | 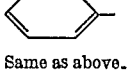 | HCl M.P.: 232° C. |
| 38 | $CH_3-$ | 1 | 2 | S | 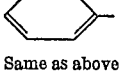 | Same as above | M.P.: 92–94° C., HCl M.P.: 221° C |
| 39 | $CH_3-$ | 1 | 2 | O | Same as above | 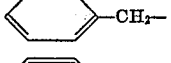$-CH_2-$ | Oxalate M.P.: 174–175° C. |
| 40 | $C_2H_5-$ | 1 | 2 | O | do | 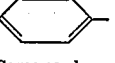 | M.P.: 106° C. |
| 41 | $CH_3-(CH_2)_3-$ | 1 | 2 | O | do | Same as above | M.P.: 45° C., maleate M.P.: 150–151° C. |
| 42 | $CH_3-CO-$ | 1 | 2 | O | do | do | M.P.: 88–89° C. |
| 43 | 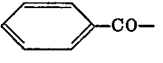$-CO-$ | 1 | 2 | S | H | $CH_3-$ | M.P.: 112–113° C. |
| 44 | Same as above | 1 | 2 | O |  | 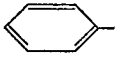 | M.P.: 127° C. |
| 45 | 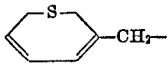$-CH_2-$ | 1 | 2 | O | $CH_3-$ | $CH_3-$ | Maleate M.P.: 175° C. |
| 46 | Same as above | 1 | 2 | O |  | 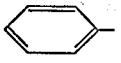 | Maleate M.P.: 198° C. (decomposition). |
| 47 | 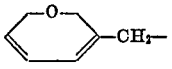$-CH_2-$ | 1 | 2 | O | Same as above | Same as above | Maleate M.P.: 175° C. (decomposition). |
| 48 | 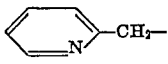$-CH_2-$ | 1 | 2 | O | do | do | M.P.: 104° C., 2HCl M.P.: 232° C. (decomposition). |
| 49 | 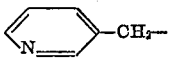$-CH_2-$ | 1 | 2 | O | do | do | 2HCl M.P.: 235–236° C. (decomposition). |
| 50 | 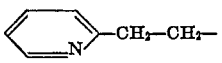$-CH_2-CH_2-$ | 1 | 2 | O | do | do | M.P.: 134° C., 2HCl M.P.: 205° C. |
| 51 | 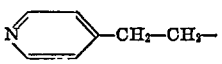$-CH_2-CH_2-$ | 1 | 2 | O | do | do | M.P.: 108–109° C., 2HCl M.P.: 230° C. (decomposition). |

EXAMPLE 52

A mixture of 9.6 g. of 1-azabicyclo[2.2.2]octan-3-one hydrochloride (3-quinuclidinone hydrochloride), 7.5 g. of 2-hydroxyisobutyric acid and 0.5 g. of concentrated sulfuric acid in 200 ml. of toluene is heated under reflux with stirring in a flask with a water trap attached for 16 hours. After cooling, the reaction mixture is concentrated under reduced pressure, and then 50 ml. of water and 200 ml.

of chloroform are added to the residue. The mixture is made alkaline with sodium carbonate. The chloroform layer is separated, washed with water and dried over anhydrous magnesium carbonate, and the solvent (chloroform) is distilled off. The dark brown oily residue is column-chromatographed on 160 g. of neutralized, activated alumina and eluted with toluene. The eluate is concentrated to give 1-azazicyclo[2.2.2]octane-3-spiro-2'-(5,5'-dimethyl-1',3'-dioxolan-4'-one) as white crystals melting at 82–85° C. Its maleate melts at 112–114° C.

EXAMPLES 53 to 56

Other examples of quinuclidine spiro compounds of the formula

and acid addition salts thereof which can be produced from a compound (III) ($R^3$ and $R^4$ combinedly representing —$CH_2$—$CH_2$—, m being 2 and n being 1) and a compound (IV) in a manner similar to that described in Example 52 are as follows:

| Example | X | $R^1$ | $R^2$ | Physical constant |
|---|---|---|---|---|
| 53 | O | 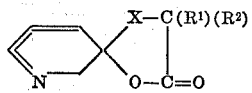 | 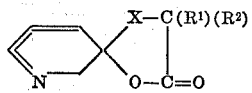 | M.P.: 154–156° C., maleate M.P.: 139–142° C. |
| 54 | S | H | H | HCl M.P.: 213–214° C. |
| 55 | O | H | 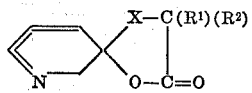 | M.P.: 154–155° C. |
| 56 | S | H | $CH_3$— | HCl M.P.: 234–235° C. (decomposition), maleate M.P.: 116–118° C. |

EXAMPLE 57

To a mixture of 10.5 g. of 3,3-diphenyl-2-oxo-1,4-dioxa-8-azaspiro[5.4]decane hydrobromide and 10 g. of sodium carbonate in a mixed solvent of 50 ml. of dimethylformamide plus 100 ml. of toluene is added 4.2 g. of benzoyl chloride. The whole mixture is refluxed with stirring for 10 hours. After cooling, insoluble matter is filtered off and the filtrate is concentrated under reduced pressure. The residue is extracted with chloroform, the chloroform layer is washed three times with water and dried over anhydrous magnesium sulfate, and then the chloroform is distilled off. The jelly-like residue (pale brown) is dissolved in isopropyl ether and the solution is allowed to stand. The crystals precipitated are collected by filtration and recrystallized from 2-propanlo to give 7 g. of 8-benzoyl - 3,3 - diphenyl - 2 - oxo - 1,4 - dioxa - 8 - azaspiro [4.5]decane as white crystals melting at 127° C.

EXAMPLE 58

A mixture of 10 g. of 3,3-diphenyl-2-oxo-1,4-dioxa-8-azaspiro[4.5]decane hydrobromide, 10 g. of sodium carbonate and 3.7 g. of allyl bromide in a mixed solvent of 50 ml. of dimethylformamide plus 100 ml. of toluene is refluxed with stirring for 8 hours. After cooling, insoluble matter is filtered off and the filtrate is concentrated under reduced pressure. The residue is extracted with chloroform. The chloroform layer is washed three times with water and dried over anhydrous magnesium sulfate, and then the chloroform is distilled off. The jelly-like residue is dissolved in a mixture of ethanol and isopropyl ether and ethanolic hydrochloric acid is added to the solution. The crystals formed are collected by filtration and re-crystallized from 2-propanol to give 6.5 g. of 8-allyl-3,3-diphenyl-2-oxo - 1,4 - dioxa - 8 - azaspiro[4.5]decane hydrochloride as white crystals melting at 244° C. (decomposition).

Proceeding by the method of Examples 57 and 58, but substituting equivalent amounts of appropriate starting materials, the following compounds are produced:

| Example | $R^4$ | n | m | X | $R^1$ | $R^2$ | $R^3$ | Physical constant |
|---|---|---|---|---|---|---|---|---|
| 59 | $CH≡C$—$CH_2$— | 1 | 2 | O | 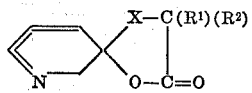 | 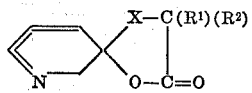 | H | Oxalate M.P.: 159–161° C. | and the compounds identical to the products of above Examples 1, 2, 14–21, 23–26, 28–32, 34–37 and 40–51.

EXAMPLE 60

To a mixture of 25 ml. of 37% formaldehyde and 25 g. of 90% formic acid is added 10 g. of 3,3-diphenyl-2-oxo-1,4-dioxa-8-azaspiro[4.5]decane. The mixture is refluxed with stirring for 3 hours. After cooling, the reaction mixture is made acid with 120 ml. of 4 N hydrochloric acid and concentrated under reduced pressure. The crystals obtained are recrystallized twice from ethanol to give 5 g. of 8-methyl-3,3-diphenyl-2-oxo-1,4-dioxa-8-azapiro[4.5]decane hydrochloride as white crystals melting at 254° C.

Proceeding by the method of Example 60, but substituting equivalent amounts of appropriate starting materials, the compounds identical to the product of above Examples 34–37 are also produced.

EXAMPLE 61

A mixture of 19 g. of 8-ethoxycarbonyl-3-methyl-2-oxo-1-oxa-4-thia-8-azaspiro[4.5]decane and 200 ml. of 20% solution of hydrogen bromide in acetic acid is heated on a water bath for 3 hours. After cooling, the acetic acid is distilled off under reduced pressure. The brown solid residue is crystallized from 2-propanol and recrystallized from methanol to give 10 g. of 3-methyl-2-oxo-1-oxa-4-thia-8-azaspiro[4.5]decane hydrobromide as white crystals melting at 227° C.

EXAMPLE 62

A mixture of 20 g. of 8-ethoxycarbonyl-3,3-diphenyl-2-oxo-1,4-dioxa-8-azaspiro[4.5]decane, 35 g. of potassium hydroxide, 300 ml. of methanol and 50 ml. of water is heated on a water bath for 22 hours. After cooling, the solvent is distilled off and water is added to the residue. The oil separated is extracted with chloroform. The chloroform layer is washed with water and dried over anhydrous magnesium sulfate, and then the chloroform is distilled off to give 11 g. of 3,3-diphenyl-2-oxo-1,4-dioxa-8-azaspiro[4.5]decane as white crystals melting at 113° C.

Proceeding by the method of Examples 61 and 62, by substituting equivalent amounts of appropriate starting materials, the compounds identical to the products of above Examples 5, 6, 8, 9 and 10 are also produced.

EXAMPLE 63

To a solution of 10 g. of 8-benzyl-3-methyl-2-oxo-1,4-dioxa-8-azaspiro[4.5]decane hydrochloride in 70 ml. of water are added 50 ml. of ethanol and 5 g. of 10% palladium-carbon. Reduction is carried out with stirring under normal pressure at room temperature until the absorption of hydrogen stops. After the reduction, the palladium-carbon is filtered off, and the filtrate is concentrated under reduced pressure. The white crystals obtained are recrystallized twice from ethanol to give 4.5 g. of 3-methyl-2-oxo-1,4-dioxa-8-azaspiro[4.5]decane hydrochloride as white crystals melting at 229° C.

EXAMPLE 64

To a solution of 10 g. of 8-benzyl-2-oxo-3-phenyl-1,4-dioxa-8-azaspiro[4.5]decane hydrochloride in 70 ml. of water are added 100 ml. of 2-propanol and 6 g. of 5% palladium-carbon. The resulting mixture is placed in an autoclave, the autoclave is charged with hydrogen at 80 atmospheres, and then the reduction is carried out at 60° C. for 1 hour. After cooling the palladium-carbon is filtered off, and the filtrate is concentrated under reduced pressure. The white crystals obtained are washed with 2-propanol and recrystallized from ethanol to give 5 g. of 2-oxo - 3 - phenyl-1,4-dioxa-8-azaspiro[4.5]decane as white crystals melting at 194-195° C.

Proceeding by the method of Examples 63 and 64, but substituting equivalent amounts of appropriate starting materials, the compounds are identical to the products of above Examples 7 and 12.

EXAMPLE 65

To a solution of 8 g. of 8-methyl-3,3-diphenyl-2-oxo-1,4-dioxa-8-azaspiro[4.5]decane (produced by Example 32) in a mixed solvent of 80 ml. of chloroform plus 30 ml. of methanol is added 5 g. of methyl iodide. The mixture is heated under reflux with stirring for 2.5 hours, and then further heated for 2.5 hours to complete the reaction. After cooling, the crystals obtained are collected by filtration and recrystallized from methanol to give 8 g. of 8,8 - dimethyl-3,3-diphenyl-2-oxo-1,4-dioxa-8-azaspiro[4.5]decanium iodide as white crystals melting at 266-267° C. (decomposition).

Other quaternary ammonium salts which can be produced from a compound (I) and alkyl halide or dimethyl sulfate by the method of Example 65 are as follows:

| Compound | Quaternizing agent | Melting point of quaternary salt (decomposition) |
|---|---|---|
| Example: | | |
| 26 | Methyl iodide | 214° C. |
| 27 | do | 185–186° C. |
| 28 | do | 233° C. |
| 30 | do | 216° C. |
| 32 | Dimethyl sulfate | 168° C. |
|  | Methyl hydrogensulfate | 241° C. |
|  | Ethyl bromide | 249° C. |
| 33 | Methyl iodide | 226° C. |
| 34 | do | 249° C. |
| 35 | do | 236° C. |
| 36 | do | 248° C. |
| 37 | do | 229° C. |
| 38 | do | 268° C. |
| 39 | do | 214–216° C. |
| 41 | do | 231° C. |
| 46 | do | 196–197° C. |
| 48 | do | 211° C. |
| 51 | do | 206° C. |
| 52 | Methyl iodide | 236–238° C. |
| 53 | do | 255–257° C. |
| 54 | do | 219–221° C. |
| 55 | do | 228–230° C. |
| 56 | do | 233–234° C. |
| 58 | do | 183–185° C. |
| 59 | do | 196° C. |

What is claimed is:

1. A compound selected from the group consisting of those spiro compounds encompassed by the following formula:

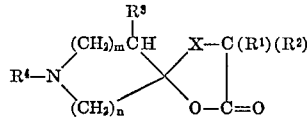

wherein each of $R^1$ and $R^2$ is a member selected from the group consisting of a hydrogen atom, a methyl group, an ethyl group, a phenyl group, a p-chlorophenyl group and a benzyl group; wherein X is a member selected from the group consisting of an oxygen atom and a sulfur atom; wherein $R^3$ represents a hydrogen atom; wherein $R^4$ is a member selected from the group consisting of a hydrogen atom, an alkyl group of from 1 to 4 carbon atoms, a methoxy-carbonyl group, an ethoxy carbonyl group, an acetyl group, a benzoyl group, a benzyl group, a phenethyl group, a pyridylethyl group, a furfuryl group, a thenyl group, an allyl group and a propargyl group; and wherein $m+n$ is an integer of 2 or 3, $m$ being 0 or 1 and $n$ being 2 or 3;

or a member selected from the group consisting of the pharmaceutically acceptable acid addition salts and quaternary ammonium salts thereof.

2. A compound according to claim 1, said compound being 8 - methyl - 3,3 - diphenyl-2-oxo-1,4-dioxa-8-azaspiro[4.5]decane.

3. A compound according to claim 1, said compound being 8 - butyl - 3,3 - diphenyl - 2 - oxo - 1,4-dioxa-8-azaspiro[4.5]decane.

4. A compound according to claim 1, said compound being 8 - methyl - 3 - methyl - 3-phenyl-2-oxo-1,4-dioxa-8-azaspiro[4.5]decane.

5. A compound according to claim 1, said compound being 8 - methyl - 3 - benzyl-3-phenyl-2-oxo-1,4-dioxa-8-azaspiro[4.5]decane.

6. A compound according to claim 1, said compound being 8 - (2 - thenyl) - 3,3-diphenyl-2-oxo-1,4-dioxa-8-azaspiro[4.5]decane.

7. A compound according to claim 1, said compound being 8 - methyl - 3,3 - diphenyl - 2-oxo-1-oxa-4-thia-8-azaspiro[4.5]decane.

8. A compound according to claim 1, said compound being 8 - methyl - 3,3 - diphenyl - 2-oxo-1,4-dioxa-8-azaspiro[4.5]decane methoiodide.

9. A compound according to claim 1, said compound being 8 - methyl - 3,3 - diphenyl - 2 - oxo-1,4-dioxa-8-azaspiro[4.5]decane ethobromide.

10. A compound according to claim 1, said compound being 8 - methyl - 3,3 - diphenyl - 2 - oxo-1,4-dioxa-8-azaspiro[4.5]decane methyl hydrogensulfate.

11. A compound according to claim 1, said compound being 8 - methyl - 3,3 - diphenyl - 2 - oxo-1,4-dioxa-8-azaspiro[4.5]decane dimethyl sulfate.

References Cited

UNITED STATES PATENTS 3,555,033   1/1971   Maillard _____ 260—293.66

FOREIGN PATENTS 227,210   1/1969   U.S.S.R. _____ 260—293.67
1,165,850   10/1969   Great Britain _____ 260—293.67

HENRY R. JILES, Primary Examiner

S. D. WINTERS, Assistant Examiner

U.S. Cl. X.R.

260—240 K, 243 R, 293.53, 293.67, 293.68, 293.69, 293.86, 293.88, 293.89, 293.9, 294.8 D, 295.5 P, 326.3, 516, 520, 526 R, 535 R; 424—246, 263, 267, 274